United States Patent [19]

Oser et al.

[11] 4,092,842

[45] June 6, 1978

[54] DEEPLY EMBOSSED SHEET PRODUCT AND METHOD AND APPARATUS FOR THE PRODUCTION THEREOF

[75] Inventors: Nathan Oser, Perrineville; Edmund John Niedzinski, Somerville, both of N.J.

[73] Assignee: Johns-Manville Corporation, Denver, Colo.

[21] Appl. No.: 735,646

[22] Filed: Oct. 26, 1976

Related U.S. Application Data

[63] Continuation of Ser. No. 622,930, Oct. 16, 1975, abandoned, which is a continuation-in-part of Ser. No. 521,829, Nov. 7, 1974, abandoned.

[51] Int. Cl.² .............................................. B21D 13/04
[52] U.S. Cl. ........................................ 72/379; 72/187; 428/174; 428/687
[58] Field of Search .............. 72/187, 379; 113/116 Z, 113/118 D, 120 W; 428/174, 178, 179, 180; 165/170; 29/157.3 D, 180 SS; 101/3 R, 3 Z

[56] References Cited

U.S. PATENT DOCUMENTS

| | | | |
|---|---|---|---|
| 1,517,633 | 12/1924 | Junkers | 29/180 |
| 1,826,344 | 10/1931 | Dalgliesh | 165/170 |
| 2,288,170 | 6/1942 | Moeller | 428/178 |
| 2,290,608 | 7/1942 | Evans | 29/180 |
| 2,644,778 | 7/1953 | Russell | 428/180 |
| 3,144,974 | 8/1964 | Eichner et al. | 113/120 W |
| 3,575,781 | 4/1971 | Pezely | 428/174 |

*Primary Examiner*—Lowell A. Larson
*Attorney, Agent, or Firm*—Robert M. Krone; Joseph J. Kelly; James W. McClain

[57] ABSTRACT

A method of deep embossing of sheet material, generally metal, is disclosed. A small scale relief pattern is first embossed across the entire sheet and thereafter a deep embossment of spaced-apart protuberances is imparted to the sheet. Both patterns in combination produce a sheet useful for reflective thermal insulation without the risk of significantly puncturing the sheet.

5 Claims, 8 Drawing Figures

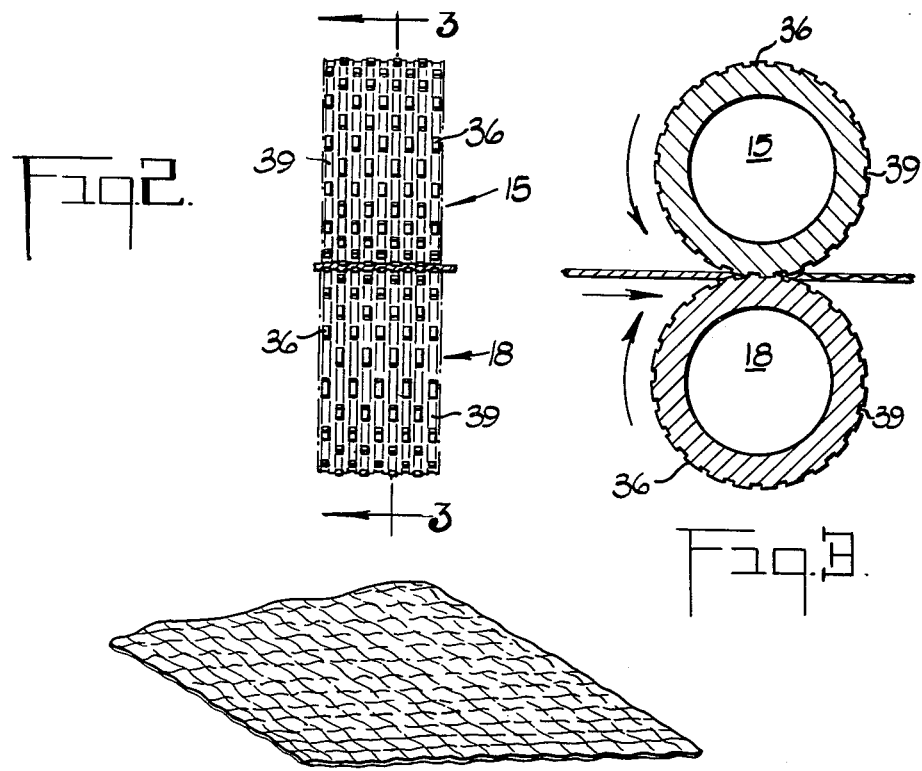
Fig. 2.
Fig. 3.
Fig. 4.
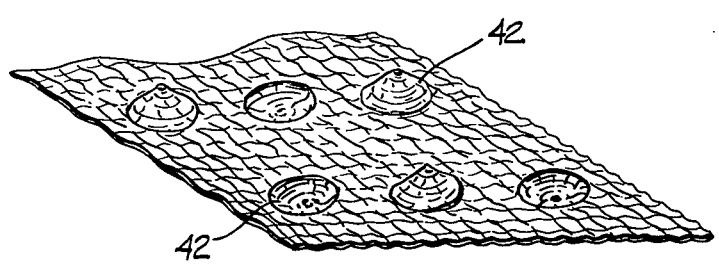
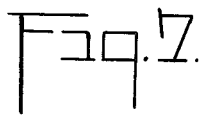
Fig. 7.

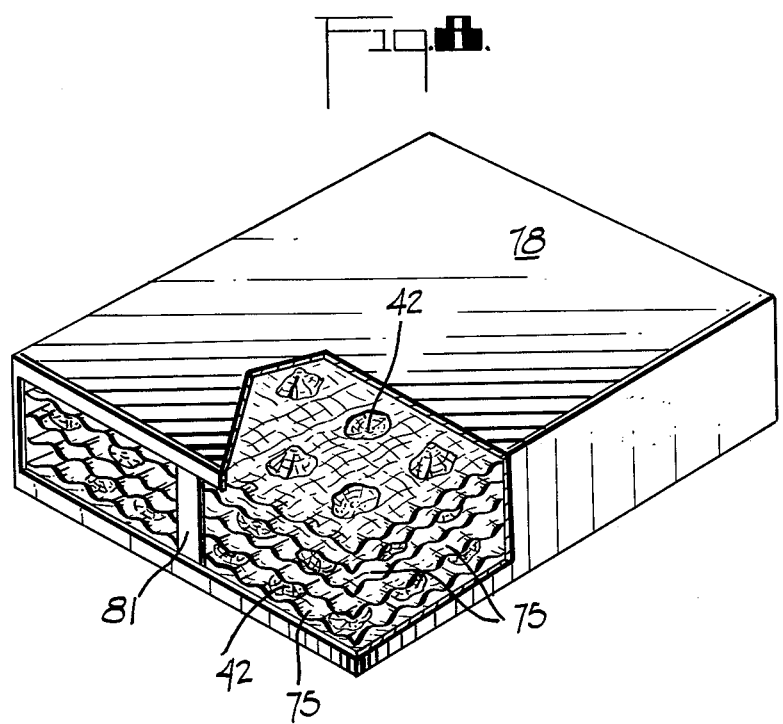

DEEPLY EMBOSSED SHEET PRODUCT AND METHOD AND APPARATUS FOR THE PRODUCTION THEREOF

This is a continuation of application Ser. No. 622,930, filed Oct. 16, 1975 which is in turn a continuation of application Ser. No. 521,829, filed Nov. 7, 1974 both now abandoned.

BACKGROUND OF THE INVENTION

The invention herein relates to deeply embossed sheets and for a method and apparatus for the production thereof. More specifically it relates to such metal sheets suitable for use in reflective thermal insulation devices.

Reflective thermal insulation devices are constructed of metallic enclosing frame containing therein a plurality of spaced-apart reflective metal sheets. A number of such structures are in use in the nuclear power industry, where reflective insulation is widely used for the thermal insulation of the nuclear reactors and associated piping. In one such type of structure, marketed by the Johns-Manville Corporation, the individual reflective metal sheets are separated by protruding standoffs embossed into each sheet, in the manner shown in U.S. Pat. No. 3,190,412. Typical reflective thermal insulation structures for use with piping are shown in U.S. Pat. Nos. 2,841,203 and 3,818,949. Both flat panel and pipe insulations are shown in U.S. Pat. No. 3,028,278. Commercial versions of the structure shown in these patents have been marketed and are in use in various nuclear power plants.

Sequential forming of sheet metal is illustrated in U.S. Pat. Nos. 473,215 and 2,743,518.

BRIEF DESCRIPTION OF THE INVENTION

The invention herein is a method for the deep embossing of a metallic sheet which comprises first impressing a small scale relief pattern comprising a plurality of embossed hills and valleys extending in a plurality of dimensions in the plane of the sheet across the entire sheet, and thereafter deeply embossing protuberances at predetermined points across the sheet, which deep protuberances are on a scale sufficiently larger than the hills and valleys of the relief pattern that each protuberance encompasses several of said hills and valleys. In a preferred embodiment, protuberances extend out of each face of the sheet, and generally alternate from opposite faces of the sheet.

Also a part of this invention is a reflective metal sheet containing throughout both surfaces thereof a small scale relief pattern and having at spaced-apart points protuberances extending from the surface of one or both of the faces of the sheet, and a reflective thermal insulation device comprising a plurality of such spaced-apart sheets.

Also a part of the present invention is an apparatus for producing such sheets and performing the method of the present invention which comprises a first set of relief embossing rolls which impart to the sheet the aforesaid small scale relief pattern and a second set of deep embossing rolls which impart the aforesaid deep embossing pattern of protuberances into the previously small scale relief patterned sheet.

BRIEF DESCRIPTION OF THE DRAWINGS

FIG. 2 is a partial elevation view showing a typical surface configuration of the relief embossing rolls.

FIG. 3 is a cross-sectional view of the relief embossing rolls taken on line 3—3 of FIG. 2, also showing the relief embossing of a typical sheet.

FIG. 4 is a perspective view of a portion of a sheet having the relief pattern embossed thereon prior to deep embossing.

FIG. 5 is a partial elevation view showing a typical surface configuration of the deep embossing rolls.

FIG. 6 is a cross-sectional view of the deep embossing rolls taken on line 6—6 of FIG. 5, also showing the deep embossing of a typical sheet.

FIG. 7 is a perspective view of a portion of a sheet having thereon both the relief and deep embossment.

FIG. 8 is a partial perspective view of a typical reflective insulation structure of this invention.

DETAILED DESCRIPTION AND PREFERRED EMBODIMENTS

Figure 1:
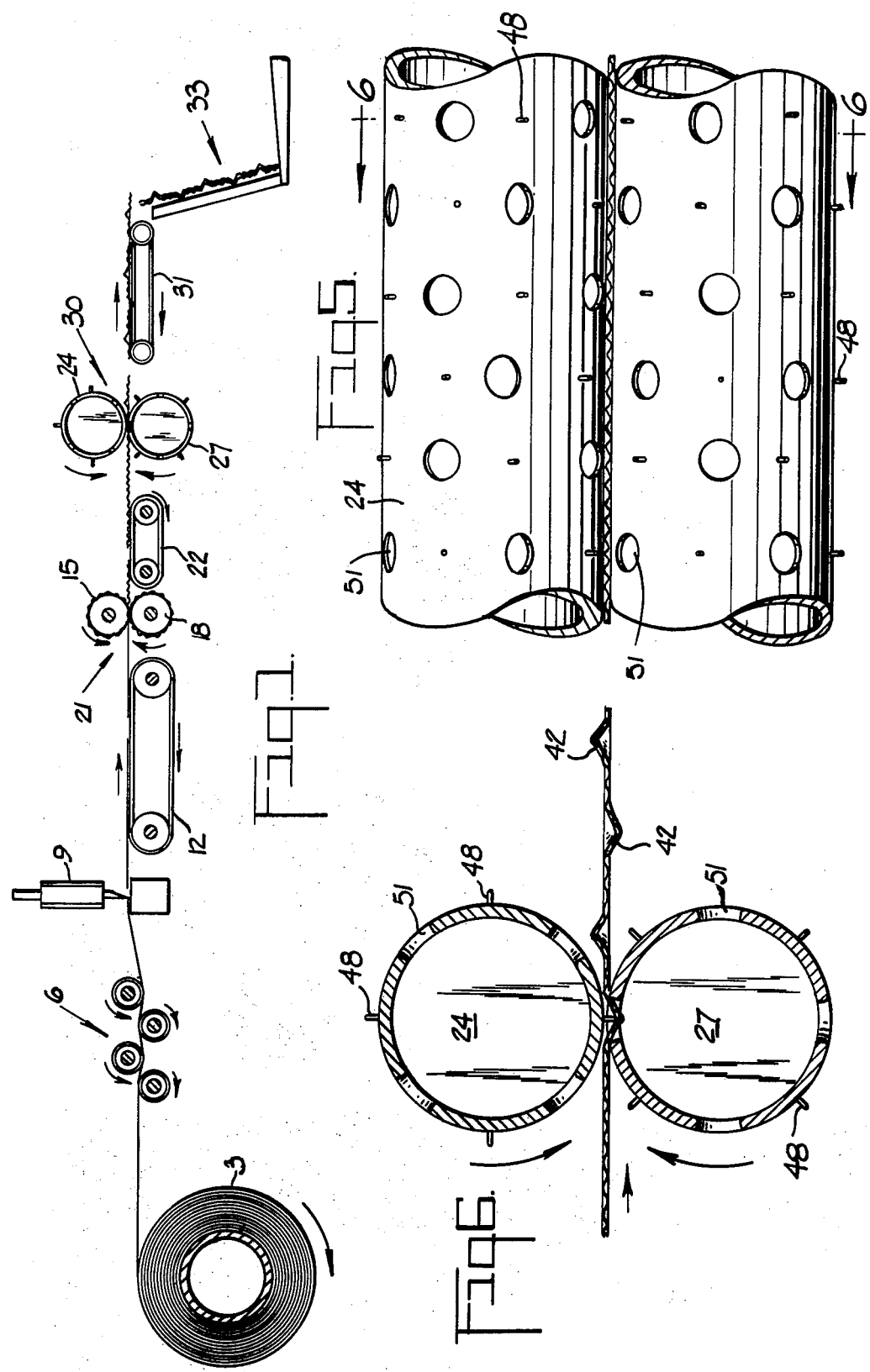
FIG. 1 illustrates schematically one embodiment of the method of deep embossing of this invention.

The invention herein can be best understood by reference to the attached drawings.

The process as a whole is illustrated schematically in FIG. 1. The sheet material to be embossed, typically a reflective metal foil such as aluminum or stainless steel, is supplied from a large roll 3. The foil sheets are normally of 1 to 5 mil thickness. The uncoiling metal foil passes through straightening rollers 6 and into cutter 9 which severs the continuous foil into individual segments of the predetermined length. The straightening rolls and cutter are all of conventional design and normally operate automatically. Suitable conventional means (not shown) may be used to regulate the length of the foil segments.

The individual foil sheet segments (hereinafter referred to simply as "sheets") are then conveyed by conveyor 12 into the nip between rolls 15 and 18. These rolls as a unit comprise the relief patterning unit generally designated 21 and illustrated in FIGS. 2 and 3. This unit imparts to each sheet a small scale relief pattern, as illustrated in FIG. 4. This small scale relief pattern comprises a plurality of small "hills" and "valleys", raised or depressed from the plane of the foil sheet by no more than about 1 cm, usually only about 0.5 to 5 mm. The hills and valleys extend in a plurality of directions in the plane of the sheet. In one common pattern they extend in two substantially mutually perpendicular directions. In another they are placed randomly so that only short segments of directionality are present, and the overall effect is multidirectional. A unidirectional pattern, however, such as simple parallel or essentially parallel corregations, will not permit the subsequent deep embossing of this invention. The hills and valleys thus cooperate to form a pattern of small raised squares, rectangles, or the like, each not exceeding about 10-20 millimeters in individual width and length. The pattern impressed by the unit 21 will extend across the entire surface of the sheet.

Following impressing of the small scale relief pattern by unit 21, the patterned sheet is conveyed by means, such as conveyor 22 into the nip of rollers 24 and 27, which together constitute the deep embossing unit 30 illustrated in FIGS. 5 and 6. Deep embossing unit 30 imparts to the surface of the relief patterned sheet a second pattern of large protuberances as illustrated in FIG. 7. The large protuberances are of a size or scale sufficiently large relative to the small scale relief embossments that each encompasses several of the relief features formed by the hills and valleys. Depending on the pattern of the deep embossing rolls 24 and 27, the pattern of protuberances may be somewhat random or may have varying degrees of regularity. It is this deep embossing which is necessary for the sheets in order to permit separation of the sheets when they are stacked as insulation. However, it has been found that this dual pattern of embossing, involving a first small scale relief pattern and then a second deeply embossed pattern, is necessary in order to obtain the configuration of FIG. 7 required for utility as reflective insulation sheets without significant puncturing of the sheets. Merely attempting to impress the deep embossing into the sheet has been found to be totally unsatisfactory, for rather than pressing protuberances into the sheet such single step deep embossing in many cases simply punches holes in the rigid sheet. The combination of the two embossing patterns, however, imparts to the sheet the ability to be relieved by stretching or expanding to compensate for the deep embossing, thus permitting the deeply embossed protuberances to be pressed out of the otherwise rigid sheet. Consequently it is critical to this invention that the two steps of embossing be used and that the small scale relief pattern impression precede the deep embossing step.

Following the deep embossing the individual sheets, now containing the standoff pattern as well as the small scale pattern are conveyed by means such as conveyor 31 to some sort of collecting device 33, as exemplified in FIG. 1 by a simple collection bin or rack.

FIGS. 2 and 3 illustrate in more detail the relief embossing rolls 21 which impart to the entire sheet the pattern exemplified in FIG. 4. The surface of these rolls is configured so as to make small embossing bends throughout the surface of the sheet, reduce it in overall width slightly, and provide a degree of "slack" in the sheet which will permit the subsequent impression of the deep embossments imparted by unit 30. To that end the rolls 15 and 18 will have counterpart elevations 26 and depressions 39. These patterned depressions and elevations may be in the form of "pebbled" surfaces, or small raised and depressed pyramids, squares, rectangles and the like, of the type which will yield the "hills-and-valleys" pattern described above. The hills and valleys may also be formed with the raised surfaces all extending from one surface of the sheet. A typical configuration is shown in FIG. 2. The exact nature of the pattern is not critical, as long as the depth and frequency of the bends and corrugations ("hills and valleys") is sufficient to impart enough slack to allow the deep embossing pattern to be subsequently imparted. A pattern of 5 mm squares (the "hills") separated by approximately 3 mm spaces (the "valleys") and embossed to a depth of approximately 1 mm, the pattern extending in two directions across an entire sheet of 3 mil thickness stainless steel, has been found quite satisfactory to permit later embossment of deep conical protuberances 42 having dimensions of approximately 50 mm diameter and 15 mm height, spaced on approximately 100 mm centers, with the deep pattern also extending in two directions across the entire sheet. The relief pattern will not be in sharp relief but rather will comprise sloping sides of the small scale "squares" or the like, as indicated generally in FIG. 4.

This deep pattern of conical protuberances 42 is imparted by unit 30 which is illustrated in greater detail in FIGS. 5 and 6. As shown in these figures the rolls 24 and 27 are configured to emboss spaced-apart cones 42 in alternate directions normal to the plane of the sheet 45. This is accomplished by the cooperation of pins 48 in one roll with corresponding holes 51 in the opposite roll. The diameter of each pin 48 will be substantially less than the diameter of the corresponding hole 51. A ratio of hole diameter to pin diameter in the range of about 3-8:1, preferably about 5:1, has been found quite satisfactory. It is also desirable to have the tips of the pins rounded (e.g., spherical) to minimize the possibilities of the foil tearing. The alternating impression is accomplished by having both pins 48 and holes 51 on each roll. In the configuration shown these are in equal numbers; however, if one wished to impress a predominance of cones in one particular direction normal to the plane of the sheet, one roll would have a predominance of holes and the other would have a predominance of corresponding pins. This concept can of course be ultimately extended to placement of all pins on one roll and all holes on the other, to emboss the cones of the sheets entirely in a single direction.

The apparatus of this invention may be constructed of any suitable conventional material, normally steel. Obviously the heavier the gauge of sheet material to be embossed, the more rugged must be the surfaces of the rolls 18, 21, 24 and 27 and the pins 36.

As illustrated in this specification, the system as configured will provide only repeated impressions of the same small and deep embossment patterns. However it is within the scope of this invention to provide easily interchangeable rolls to vary the embossing patterns if desired.

Further, although FIG. 1 shows the individual sheets being cut by cutter 9 prior to embossment, it is also within the scope of this invention to cut the individual sheets apart either after the small relief embossment or after the deep embossment.

A typical structure utilizing the sheets of this invention as reflective thermal insulation is shown in FIG. 8. A plurality of sheets 75 are partially enclosed in a casing 78. The standoff protuberances 42 separate the sheets and generally form the only points of contact between adjacent superimposed sheets. The structure can be flat as shown in FIG. 8 or curved in the manner of the device shown in U.S. Pat. No. 3,818,949. The number of sheets present will depend on the size of the device and the quantity of heat to be contained, but ordinarily about 5 to 25 sheets are found sufficient. The sheets may be retained in the casing by such means as straps 81, perforated plates, or the like.

We claim:

1. A method for the deep embossment of a single layer of sheet material which comprises first embossing across said sheet material a small scale relief pattern of a plurality of directions across at least one of the surfaces of said sheet material, said hills and valleys extending outwardly from at least one of the surfaces of said sheet material not more than 1 cm, and thereafter embossing in superimposed relationship on said relief pattern a deep embossment pattern, said deep embossment pattern comprising a plurality of large protuberances, each of said protuberances being of a scale sufficiently large relative to the relief features of said small scale relief pattern to encompass at least portions of several of said hills and valleys, said large protuberances being present in a number sufficient to prevent adjacent sheets of said sheet material from touching except at the points of said protuberances when at least two sheets of said sheet material are stacked in vertical array.

2. The method of claim 1 wherein the protuberances extend alternately from opposite faces of the sheet material.

3. The method of claim 1 wherein said hills and valleys of said small scale relief pattern extend in two directions substantially perpendicular to each other across said sheet.

4. The method of claim 1 wherein said hills and valleys in said small scale relief pattern extend outwardly a distance of 0.5 to 5.0 mm.

5. The method of claim 1 wherein said small scale relief pattern comprises a plurality of approximately 5 mm squares separated by approximately 3 mm spaces and wherein said protuberances have dimensions of approximately 50 mm diameter and 15 mm height and are spaced on approximately 100 mm centers.

* * * * *